April 7, 1970   J. E. THOMPSON   3,505,590

TEMPERATURE RESPONSIVE OUTPUT VOLTAGE APPARATUS

Filed Sept. 7, 1967

INVENTOR.
James E. Thompson
BY
Mueller, Aichele, & Rauner
Atty's

United States Patent Office 3,505,590
Patented Apr. 7, 1970

---

3,505,590
TEMPERATURE RESPONSIVE OUTPUT VOLTAGE APPARATUS
James Elbert Thompson, Scottsdale, Ariz., assignor to Motorola, Inc., Franklin Park, Ill., a corporation of Illinois
Filed Sept. 7, 1967, Ser. No. 666,130
Int. Cl. G05f 1/58, 1/60; H02d 9/00
U.S. Cl. 323—19   7 Claims

ABSTRACT OF THE DISCLOSURE

The base-emitter junction of a semiconductor device is used as a shunt regulator to provide a reference voltage across a first resistor portion of a voltage divider network. The reference voltage varies inversely with temperature to provide a voltage across the voltage divider which varies inversely with temperature. Limiting voltage means are provided for limiting the minimum voltage excursion of the circuit and the maximum voltage excursion to provide a somewhat S-shaped temperature responsive curve of voltage with respect to temperature.

BACKGROUND OF THE INVENTION

This invention relates to temperature responsive voltage generation circuits and more particularly to such a voltage generation circuit which adjusts voltage with respect to temperature between upper and lower limits.

In some voltage regulator systems, such as those used in automotive electrical systems, the generated voltage should vary in accordance with temperature changes. At below 0° C., for example, the voltage generated by the alternator for changing a battery should be maximum since at the colder temperatures the battery requires a higher voltage to accept at given charge level. At the higher temperatures, it is desired to reduce the voltage generated such that the battery will not over-charge. Such temperature responsive voltage generators are also useful to supply electrical signals indicative of temperature at remote sites, therefore can find applications as remote indicating thermometers.

SUMMARY OF THE INVENTION

It is an object of this invention to provide a temperature responsive electrical circuit which supplies a voltage varying inversely with temperature and having upper and lower limits.

A feature of the present invention includes the usage of a base-to-emitter rectifying junction or diode of a transistor, for example, as a temperature responsive element in a circuit. A voltage divider is connected to the base circuit such that the base-to-emitter rectifying junction acts as a shunt regulator to a portion of a voltage divider. Such regulation provides a temperature varied voltage in the voltage divider which is supplied as an output signal. A voltage clamp is provided at one of the terminals such that the voltage at the terminal is limited to a certain maximum value. A second clamp is provided for limiting the minimum value of the voltage. The second clamp may be a shunt type transistorized regulator.

THE DRAWING

DESCRIPTION OF THE ILLUSTRATIVE EMBODIMENT

Figure 1:
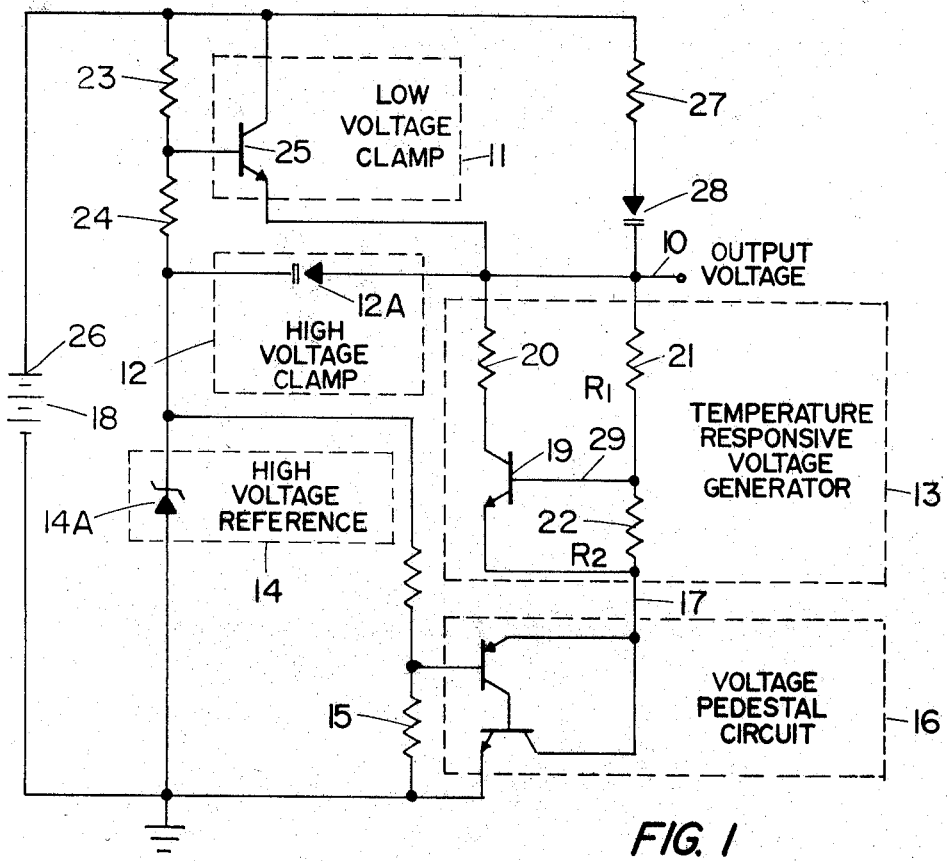
FIG. 1 is a schematic diagram of an embodiment of the present invention.
Figure 2:
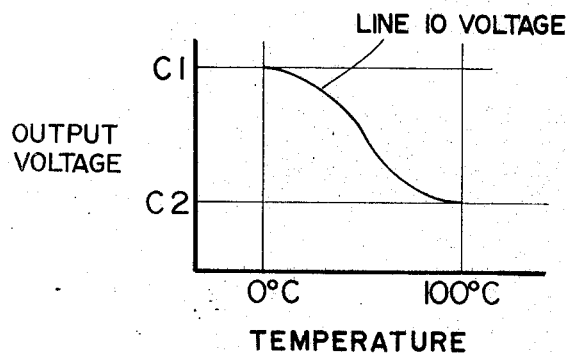
FIG. 2 is a graph showing the voltage-temperature characteristics of the FIG. 1 circuit.

Referring now to the drawing, FIG. 2 illustrates the voltage variation on output line 10 of the FIG. 1 circuit in accordance with temperature. In FIG. 2 it is seen at 0° C. the output voltage on line 10 is at a maximum amplitude C1. At the 100° C., i.e., the high end of the temperature range, the line 10 output voltage is at clamped minimum amplitude, C2. Within the temperature range of 0° C. to 100° C. the voltage variation on line 10 is inverse with respect to temperature. The voltage amplitude limits are set by the two clamps 11 and 12 (FIG. 1), the operation of which will be later described. The voltage variation outside the temperature limits of 0° C. and 100° C. may vary somewhat from the clamped amplitudes.

Referring particularly now to FIG. 1, the temperature responsive voltage generation circuit includes the temperature responsive voltage or slope generator 13, low voltage clamp 11, high voltage clamp 12, and high voltage reference circuit 14, which may be a Zener diode 14A as shown. Voltage divider 15 divides the circuit 14 voltage and supplies the divided voltage to circuit 16 which is recognized as a two transistor emitter-follower circuit. Emitter-follower circuit 16 always supplies a voltage amplitude on line 17 which is a predetermined portion of circuit 14 voltage amplitude. As such, circuit 16 provides a so-called voltage pedestal to the temperature responsive circuit 13 upon which the voltage variation with temperature occurs. Battery 18, which may be any known power supply, supplies power to the circuits.

Operation of temperature responsive voltage generator 13 will be first described. It will be shown that the voltage between generator terminals consisting of lines 10 and 17 varies inversely with respect to temperature between 0° and 100° C. Temperature variation is caused by a temperature responsiveness of the base-to-emitter junction or diode of transistor 19. It is well known that such temperature characteristic is negative with respect to temperature, that is as the temperature increases, the forward voltage drop across the diode decreases. The rate of change of a typical base-to-emitter diode or junction is about minus 2 millivolts per degree centigrade temperature change. The temperature responsive generator 13 can be analyzed as having two parallel current paths; one path comprising transistor 19 with current limiting resistor 20 and the second path comprising the voltage divider consisting of resistor 21 which in the following analysis has resistance value R1 and resistor 22 having resistance R2. First, it should be noted that the base-to-emitter diode of transistor 19 is in parallel circuit relation to resistor 22 and, thereby, regulates or controls the voltage drop thereacross in accordance with the temperature responsive voltage drop normally associated with a forward biased base-to-emitter diode. Such voltage has an amplitude $\phi$. $\phi$ is the temperature responsive voltage across resistor 22.

Next, derivation of the equivalent circuit of the temperature responsive generator 13, is described to show the generator 13 temperature responsiveness. An electrical current, having amplitude I, flows from line 10 to line 17 through generator 13. The temperature responsive voltage generated in generator 13 as a result of such current flow is equal to $\phi(R2/R1)$. This voltage can be viewed as a temperature responsive battery. Since generator 13 is not perfect there is included in the equivalent circuit a series resistance equal to $R1/(B+1)$, the dynamic impedance of generator 13. B is the base to collector current gain of transistor 19.

The current, I, flowing from line 10 through line 17, is equal in magnitude to the sum of the currents flowing through transistor 19 and resistor 21. Since the emitter-to-base diode of transistor 19 determines the voltage across resistor 22, the current flow through resistor 22 need not be separately considered. The transistor 19 base current, $i_b$, flowing on line 29 controls the current conductivity of transistor 19. Therefore, the current flowing from the collector electrode to the emitter electrode of transistor 19 (also the current through resistor 20) is equal to $Bi_b$ wherein B is the current gain of transistor 19. The current through resistor 21 has two components. The first current component also flows through resistor 22 and has an amplitude $\phi/R2$; it being remembered that the voltage across resistor 22 is determined by the voltage drop across the base-to-emitter diode of transistor 19. The second curent component is the base current flowing over line 29 equal to $i_b$. Therefore the total current I is represented as:

$$I = Bi_b + i_b + \phi/R2 \qquad (1)$$

The potential difference, V, between lines 10 and 17 is equal to the current, I, times the impedance of the circuit:

$$V = (\phi/R2 + i_b)R1 + \phi \qquad (2)$$

The above equation represents the voltage drop across the voltage divider 21, 22 with the left hand term representing the voltage drop across resistor 21 (R1) while $\phi$ is the voltage drop across resistor 22.

Solving Equation 1 for the base current $i_b$:

$$i_b = (I - \phi/R2)/(B+1) \qquad (3)$$

Factoring Equation 2:

$$V = \phi(R1/R2) + R1 i_b + \phi \qquad (4)$$

Substituting Equation 3 into Equation 4 and rearranging:

$$V = \phi(R1/R2) + \phi + R1(I - \phi/R2)/(B+1) \qquad (5)$$

Factoring:

$$V = \phi(R1/R2) + \phi + (R1)I/(B+1)$$
$$- R1(\phi/R2)/(B+1) \qquad (6)$$

Factoring out the term $\phi$:

$$V = \phi\{R1/R2 + 1 + R1/[(R2)(B+1)]\} + IR1/(B+1) \qquad (7)$$

In Equation 7 the term on the left hand multiplied by $\phi$ is the temperature responsive generator portion while the right hand term is the voltage drop due to the current, I, flowing through the incremental impedance, $R1/(B+1)$, the temperature responsive voltage generator 13. In practice the term "$-R1/(R2)(B+1)$" is negligible; the Equation 7 may be simplified to:

$$V = \phi(R1/R2 + 1) + IR1/(B+1) \qquad (8)$$

Equation 8 is a mathematical representation of the equivalent circuit of temperature responsive circuit 13 wherein the voltage between lines 10 and 17 is formed by the temperature responsive portion and an incremental and dynamic impedance portion.

At the 0° C., the FIG. 1 circuit is designed such that the voltage on line 10 is equal to or greater than the Zener or reverse avalanche voltages of diode 14A. Clamp diode 12A limits the voltage on line 10 to that of the Zener voltage. Therefore, as the temperature responsive circuit 13 tends to provide a higher voltage on line 10 than the Zener voltage of diode 14A, clamp 12 becomes conductive to limit the voltage on line 10 to such Zener voltage plus the voltage drop across diode 12A.

At the high end of the temperature range, 100° C., the circuit is designed such that the reduced voltage on line 10 together with the base voltage at the junction of resistors 23 and 24 bias transistor 25 to current conduction. This action clamps the line 10 voltage to that of the Zener diode 14A minus the voltage across resistor 24 plus the voltage between the base and emitter electrodes of transistor 25. The current flowing through transistor 25 is sufficient to compensate for the continuing action of circuit 13 further reducing line 10 with further increases in environmental temperature. Resistor 20 in circuit 13 limits such additional current to an amplitude below a destructive level for transistor 19. The current limiting action causes transistor 19 to current saturate reducing its $\beta$ (current gain) and thereby limiting temperature responsiveness to approximately the arbitrarily selected temperature range.

Circuit behavior outside the selected temperature range (below 0° C. and above 100° C.) is controlled by the various base-to-emitter temperature responsiveness of clamp devices 12A and 25 to adjust the clamp potentials from the design amplitudes C1 and C2.

Resistor 27 connects battery 18 terminal 26 to line 10 through temperature compensation diode 28 (compensates for temperature variation in the base-to-emitter diode of transistor 25). Transistor 25 acts as a shunt regulator to resistor 27 during the aforedescribed clamping action; at other times transistor 25 is non-conductive. The voltage amplitude on line 10 with respect to ground reference potential is always the summation of voltages across generator 13 and circuit 16.

I claim:

1. Temperature responsive electrical apparatus, including in combination,
   impedance means having an input end for receiving electrical power,
   first means connected to said impedance means to receive power therefrom for establishing a first voltage magnitude,
   second means establishing a second voltage magnitude in response to said first voltage magnitude and which second voltage magnitude is less than said first magnitude,
   temperature responsive voltage generation means connected to said impedance means and having an output terminal for supplying a temperature varying output voltage magnitude and receiving power from said impedance means for establishing a temperature varied voltage on said output terminal,
   first clamp means electrically connecting said output terminal to said first means for limiting the magnitude of any output voltage on said output terminal to a magnitude no greater than a predetermined magnitude related to said first magnitude,
   second clamp means connected to said output terminal and across said impedance means and responsive to a predetermined relation between said output voltage magnitude and said first magnitude to provide a reduced impedance path for said power from said input end to said output terminal for supplying additional power to said voltage generation means whereby reduced voltage supplied by said voltage generation means is compensated for to provide a lower limit on said output voltage magnitude.

2. The apparatus of claim 1 wherein said first means is a Zener diode and said second means comprises an emitter-follower type circuit having an input connection to said Zener diode and an emitter-follower output connection to said voltage generation means.

3. The apparatus of claim 2 wherein said temperature responsive voltage generation means comprises a semiconductor device having emitter-, base-, and collector-type electrodes, a voltage divider having ends respectively connected to said output terminal and to said emitter-follower-type-circuit-output connection and said base electrode connected to said divider between its ends, and said transistor emitter and collector electrodes respectively connected to opposite ends of said voltage divider such that the voltage between said emitter-follower-type-circuit-output connection and said base electrode is always determined by the voltage drop from the base electrode to said emitter electrode irrespective of the impedance of that portion of said voltage divider between the base electrode and said emitter-follower-type-circuit-output connection.

4. The apparatus of claim 3 wherein said first clamp means comprises a diode connected between said output terminal and said first means and poled to conduct current whenever said output terminal voltage magnitude exceeds said first magnitude.

5. The apparatus of claim 4 wherein said second clamp means comprises a transistor device connected between said output terminal and said input impedance means input and having a base electrode, a second voltage divider connected between said impedance means input end and said Zener diode and having an intermediate point connected to said base electrode of said second clamp means transistor.

6. A temperature responsive electrical apparatus, including in combination,
a voltage divider comprising first and second resistors, the resistors of said divider being connected respectively between first and second output terminals;
a first transistor having collector, base and emitter electrodes, said base electrode being connected to the junction of said first and second resistors, said emitter electrode being connected to the first output terminals, said first transistor exhibiting a temperature-voltage characteristic between said base and emitter electrodes, the electrical impedance of said voltage divider being such that the voltage drop between the base and emitter electrodes of said first transistor determines the voltage drop between the first output terminal and the base electrode;
a third resistor connected between said collector electrode and the second output terminals;
impedance means connected between the second output terminal and a current source, said impedance means including a low voltage clamp means comprising a second transistor connected across said impedance means, said impedance means also including a base control circuit means connected to the base electrode of the second transistor for biasing said transistor to current conduction whenever the voltage between said output terminals decreases below a predetermined magnitude, whereby
the voltage between said output terminals varies with temperature and is determined by the product of the ratio of the resistance of the second resistor to the resistance of the first resistor and the voltage between the base and emitter electrodes of said first transistor.

7. The temperature responsive electrical apparatus of claim 6 further including
a high voltage clamp means connected between the first output terminal and said impedance means, said high voltage clamp means preventing the voltage appearing between said output terminals from exceeding a predetermined magnitude.

References Cited

UNITED STATES PATENTS

| | | | |
|---|---|---|---|
| 3,219,843 | 11/1965 | Follett | 307—310 |
| 3,221,241 | 11/1965 | Greenberg et al. | 323—22 X |
| 3,258,606 | 6/1966 | Meadows | 330—23 X |

LEE T. HIX, Primary Examiner

A. D. PELLINEN, Assistant Examiner

U.S. Cl. X.R.

322—33; 323—39